E. J. KANE.

CARBURETER FOR INTERNAL COMBUSTION ENGINES.

APPLICATION FILED NOV. 15, 1915.

Reissued Dec. 5, 1916.

14,224.

3 SHEETS—SHEET 1.

Inventor,
Edmund J. Kane,
By Chas. E. Lord,
Atty.

E. J. KANE.

CARBURETER FOR INTERNAL COMBUSTION ENGINES.

APPLICATION FILED NOV. 15, 1915.

Reissued Dec. 5, 1916.

14,224.

3 SHEETS—SHEET 2.

Inventor:
Edmund J. Kane,
By Chas. E. Lord
Atty.

E. J. KANE.

CARBURETER FOR INTERNAL COMBUSTION ENGINES.

APPLICATION FILED NOV. 15, 1915.

Reissued Dec. 5, 1916. 14,224.

3 SHEETS—SHEET 3

Inventor:
Edmund J. Kane,
By Chas. E. Lord
Atty.

UNITED STATES PATENT OFFICE.

EDMUND J. KANE, OF CHICAGO, ILLINOIS, ASSIGNOR, BY MESNE ASSIGNMENTS, TO INTERNATIONAL HARVESTER CORPORATION, A CORPORATION OF NEW JERSEY.

CARBURETER FOR INTERNAL-COMBUSTION ENGINES.

14,224. Specification of Reissued Letters Patent. Reissued Dec. 5, 1916.

Original No. 1,144,549, dated June 29, 1915, Serial No. 737,637, filed December 19, 1912. Application for reissue filed November 15, 1915. Serial No. 61,701.

*To all whom it may concern:*

Be it known that I, EDMUND J. KANE, a citizen of the United States, residing at Austin, Chicago, in the county of Cook and State of Illinois, have invented certain new and useful Improvements in Carbureters for Internal-Combustion Engines, of which the following is a full, clear, and exact specification.

My invention relates to carbureters designed to use a heavy hydrocarbon oil, such as kerosene, for fuel, wherein a quantity of water is admitted to the mixing chamber under heavy load conditions, and wherein it is necessary to automatically control the admission of water in proportion to the amount of fuel consumed; the object of my invention being to provide a mechanism controlled by the engine governor that will provide a proper combustible mixture of hydrocarbon, air and water, simple in construction and efficient in operation. These objects are attained by means of the mechanism illustrated by the accompanying drawings, in which—

Figure 1:
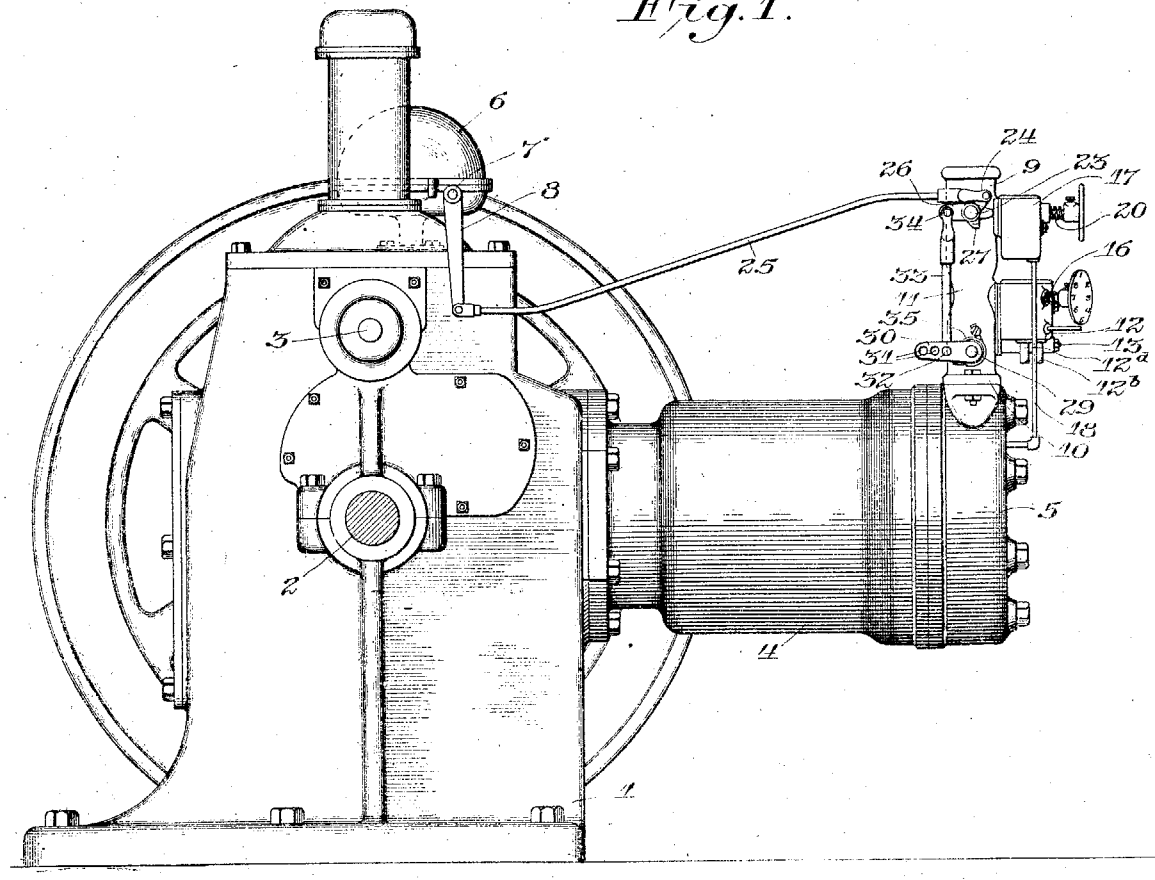
Figure 3:
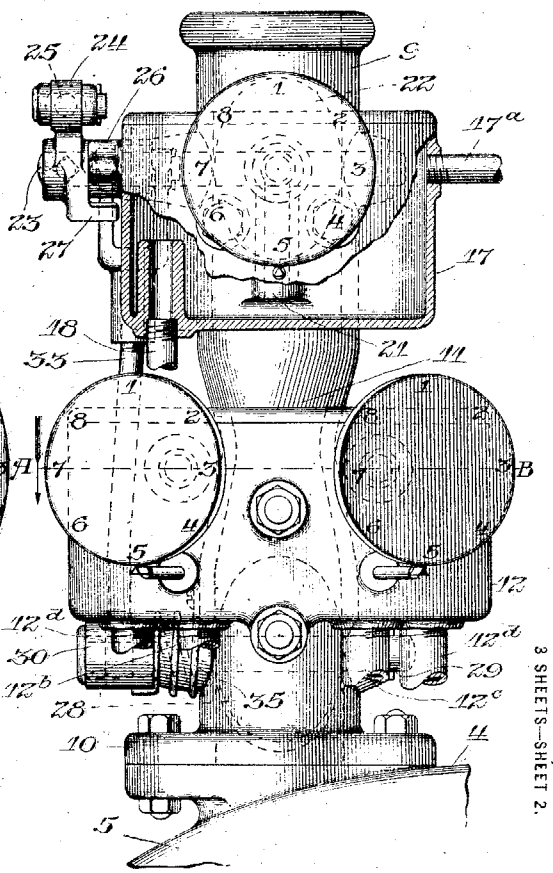
Figure 2:
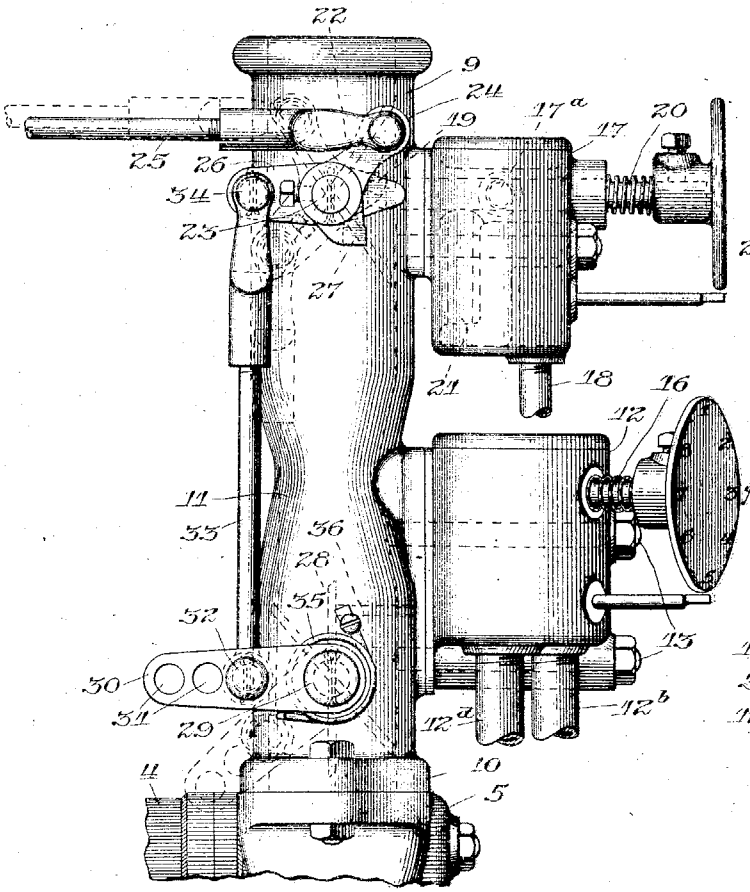
Figure 4:
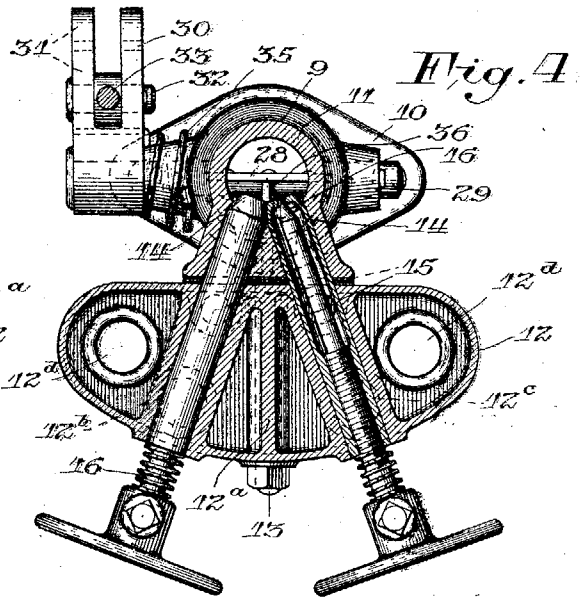
Figure 5:
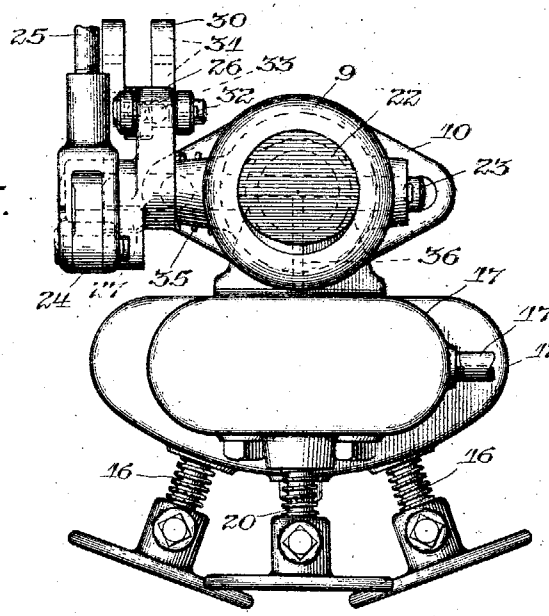
Figure 6:
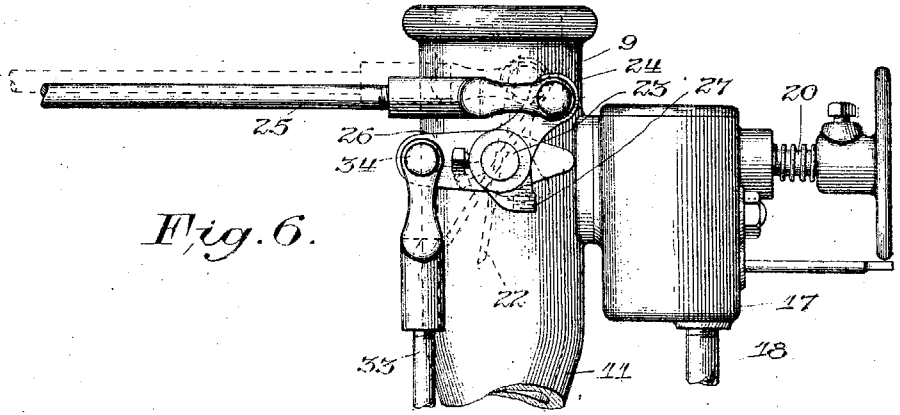

Figure 1 is a side elevation of an internal combustion engine having my invention forming a part thereof; Fig. 2 is an enlarged side elevation of the carbureter mechanism; Fig. 3 is a side elevation of Fig. 2, partly in section; Fig. 4 is a cross section of Fig. 3 along line A—B; Fig. 5 is a top plan view of Fig. 2; and Fig. 6 is a side elevation of the upper part of Fig. 2 and designed to illustrate the operation of the air throttling valve.

The same reference characters designate like parts throughout the several views.

1 represents the crank case of an internal combustion engine, 2 the engine crank shaft journaled in bearings carried by the crank case, 3 the cam shaft, and 4 the power cylinder including a cylinder head 5. Any of the common forms of centrifugal governor mechanism may be used and may be inclosed by a casing 6, and includes a rock shaft 7 journaled in bearings carried by the casing and having a depending arm 8 secured thereto.

9 represents the body of a vertically arranged mixing chamber, having a flange 10 at the lower end thereof whereby it is secured to the cylinder head 5, and a constricted central portion 11.

12 represents a constant level fuel feed cup secured to the body of the mixing chamber by means of bolts 13, and divided, by means of a partition $12^a$, into two separate receptacles, one communicating with a source $12^b$ of gasolene supply and the other with a source $12^c$ of kerosene or other heavy hydrocarbon supply, and having the usual outflow pipes $12^d$ connected therewith whereby a predetermined level of fuel is maintained in each cup.

14 represents feed nozzles communicating with the fuel receptacles by means of vertically arranged conduits 15 in a common way, the nozzles being directed along lines radial to the axis of the mixing chamber and in the same plane as the constricted portion thereof, and having the flow of liquid therethrough controlled by needle valves 16.

17 represents a constant level water feed cup secured to the body of the mixing chamber, near the upper end thereof, and communicating with a source $17^a$ of water supply, and having an overflow pipe 18, a feed nozzle 19 controlled by a needle valve 20, and communicating with the cup by means of a vertical conduit 21. The upper end of the mixing chamber is open to the atmosphere, and 22 represents a butterfly valve secured to a stem 23 journaled in opposite walls of the casing and having the axis thereof in the same plane as that of the feed nozzle 19, and having an arm 24 secured to one end thereof that is connected to the lever 8 of the governor mechanism by means of a rod 25.

26 represents an arm loosely journaled upon the stem adjacent the arm 24, and 27 represents a laterally extending finger integral with arm 24 and adapted to engage with arm 26 when the former has been moved by the governor mechanism through a predetermined degree of angularity.

28 represents a mixture throttling butterfly valve mounted upon a stem 29 journaled in opposite walls of the mixing chamber, near the lower end thereof, having an arm 30 secured to one end that is provided with a series of openings 31 therein that may selectively receive a pin 32 whereby the arm is connected with the lower end of a rod 33, adjustable as to length, the opposite end of the rod being connected with the arm 26, carried by the valve stem 23, by means of a pin 34. The valve 28 is normally turned by means of a spring 35 to an open position, with the upper end thereof resting against a pin 36 carried by the wall of the mixing chamber.

In operation, with the engine running under no load, or light load, the air throttling valve and the mixture throttling valve are substantially closed in the same direction, as indicated by dotted lines in Fig. 2, thus preventing the drawing or sucking in of water, the resulting fuel supply being rich in quality. As the load is increased and a greater quantity of fuel is required, the valves are turned clockwise toward an open position by the governor mechanism, and when they reach a position as shown by the dotted lines in Fig. 6, the finger 27 disengages with the arm 26. Upon a further movement of the valve 22 in the same direction, the mixture throttling valve 28 is left wide open, while the partial closing of valve 22 by a continued clockwise movement tends to create a vacuum in the mixer, resulting in the drawing in of more fuel and water, when the speed of the engine falls below normal and the engine is overloaded.

What I claim as my invention, and desire to secure by Letters Patent, is:

1. A carbureter for internal combustion engines having, in combination, a vertically arranged mixing chamber communicating with an engine cylinder and with the atmosphere, an air throttling valve including a valve stem journaled in opposite walls of said mixing chamber near the upper end thereof, an arm secured to said valve stem and means whereby said arm may be connected with an engine governor mechanism, a second arm loosely mounted upon said stem and adapted to be turned axially by said first named arm when the latter has reached a predetermined degree of angular movement, a mixture throttling valve including a valve stem journaled in the walls of said chamber near the lower end thereof, an arm secured to said stem, an operative connection between said arm and said second arm, a spring operative to turn said mixture throttling valve toward an open position, and a fuel feed mechanism communicating with said mixing chamber.

2. A carbureter for internal combustion engines having, in combination, a mixing chamber communicating with an engine cylinder and with the atmosphere, fuel feed mechanism communicating with said mixing chamber, rocking air throttling and mixture throttling valves mounted in said chamber upon opposite sides of said fuel feed mechanism and including valve stems, means whereby said air throttling valve may be connected with an engine governor mechanism in a manner to be controlled thereby, a spring operative to normally retain said mixture throttling valve in an open position, an arm loosely mounted upon the stem of said air throttling valve, a second arm secured to the stem of said mixture throttling valve, and a link connection between said arms and said air throttling valve having a limited angular movement independent of said mixture throttling valve.

3. In a carbureter for internal combustion engines, the combination of a mixing chamber, an air throttling valve, a mixture throttling valve, and a connection between said valves whereby said valves may be actuated together or independently of each other automatically, said valves being controlled in accordance with engine working conditions.

4. In a carbureter for internal combustion engines, the combination of a mixing chamber, air throttling and mixture throttling valves, and a connection between said valves whereby said valves are actuated together under light load conditions, and one of said valves actuated independently of the other under heavy load conditions to vary the degree of vacuum in said mixing chamber.

5. In a carbureter for internal combustion engines, the combination of a mixing chamber, interconnected air throttling and mixture throttling valves in said chamber, said air throttling valve having two closed positions and said mixture throttling valve one closed position, said valves being actuated in accordance with engine working conditions, and means whereby said mixture throttling valve is arrested in open position while said other valve is free to move to vary the degree of vacuum in said chamber.

6. In a carbureter for internal combustion engines, the combination of a mixing chamber, fuel and water feed mechanisms associated therewith, an air throttling valve adapted to control the degree of vacuum in said chamber and the admission of water, a mixture throttling valve controlling the admission of fuel, and an operative connection between said valves whereby said valves are actuated together under certain conditions and one independently of the other under other conditions.

7. In a carbureter for internal combustion engines, the combination of a mixing chamber, a water supply mechanism associated therewith, and a valve having two closed positions for controlling the vacuum in said mixing chamber, one in which water is permitted to enter said chamber and the other preventing the admission of water.

8. In combination, a governor, and a carbureter having a mixing chamber, a water supply mechanism associated therewith, and a valve controlled by said governor having two closed positions for controlling the vacuum in said mixing chamber, one in which water is permitted to enter said chamber and the other preventing the admission of water.

9. In a carbureter for internal combustion engines, the combination of a mixing chamber, water supply means associated therewith, and a valve having two closed positions for controlling the vacuum in said mixing chamber in a manner to permit the vacuum to extend to said water supply means under certain operating conditions and to prevent the extension of the vacuum to said water supply means under different operating conditions.

10. In a carbureter for internal combustion engines, the combination of a mixing chamber, fuel and water supply means associated therewith, and interconnected air throttling and mixture throttling valves in said chamber, said air throttling valve having two closed positions for controlling the vacuum in said mixing chamber in a manner to permit the vacuum to extend to said water supply means under certain operating conditions and to prevent the extension of the vacuum to said water supply means under different operating conditions.

11. A carbureter for an engine including a throttle valve, an air inlet valve, and a speed responsive device connected with the throttle valve and with the air inlet valve to move the latter toward closed position after the throttle valve is in full open position.

12. A carbureter for an engine including a throttle valve, an air inlet valve, fuel feeding means intermediate said valves, a device for uniting the valves and including a lost motion connection, and means operating through the device to control the action of the throttle during ordinary speed changes and to move the air inlet valve toward closed position upon an abnormal decrease in speed.

13. The combination of an engine, a carbureter connected therewith, and a speed responsive device controlling the carbureter, said carbureter including an air inlet valve, and a connection between the valve and speed responsive device whereby the valve is moved toward closed position as the speed of the engine drops below a predetermined point.

14. The combination of an engine having a carbureter connected therewith and means controlling the carbureter, said carbureter comprising a fuel spraying nozzle, throttle and air inlet valves at opposite sides thereof, and a connection between the valves for permitting simultaneous movement thereof during average speed changes, and independent movement of the air inlet valve during a drop in speed below a predetermined point.

15. The combination of an engine, a carbureter therefor comprising fuel admitting means and air inlet and throttle valves; arms connected with the valves; a link having a direct connection with one arm and a lost motion connection with the other arm whereby the air inlet valve may be moved toward closed position while the throttle remains open.

16. The combination of an engine provided with a speed responsive device; a carbureter for the engine comprising air inlet conduit, mixing chamber, mixture outlet conduit, valve in said inlet conduit, device for feeding fuel into said inlet conduit, and throttle valve in said outlet conduit and operatively controlled by the speed responsive device; and means controlled by the speed responsive device to move the air inlet valve toward closed position during a drop in speed below a predetermined point, and after the throttle valve is moved to full or approximately full open position.

17. A carbureter for an engine comprising air inlet conduit, mixing chamber, mixture outlet conduit, means for feeding fuel into the air indrawn through the inlet conduit, throttle valve in the outlet conduit, valve in said inlet conduit, and means for moving the valves to vary the passage openings through said conduits simultaneously during normal operation and to move the inlet conduit valve toward closed position when the throttle valve reaches its full or approximately full open position.

18. A carbureter for an engine comprising air inlet conduit, mixing chamber, mixture outlet conduit, means for feeding fuel into the air indrawn through said inlet conduit, throttling valve in said outlet conduit and adapted to vary free opening therethrough, valve in said inlet conduit and adapted to vary the free opening therethrough, and means for moving said air inlet valve toward closed position when the throttling valve reaches its full or approximately full open position.

EDMUND J. KANE.

Witnesses:
WILLIAM ELLIS,
CHAS. L. BYRON.